(12) United States Patent
Ogunbekun et al.

(10) Patent No.: US 11,754,007 B2
(45) Date of Patent: Sep. 12, 2023

(54) SYSTEMS AND METHODS FOR EXHAUST GAS RECIRCULATION

(71) Applicant: Cummins Inc., Columbus, IN (US)

(72) Inventors: Olumayokun Ogunbekun, Columbus, IN (US); Sriram S. Popuri, Greenwood, IN (US); Scott Robert Bardakjy, Columbus, IN (US); Avra Brahma, Fishers, IN (US); Yongsoon Yoon, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/818,128

(22) Filed: Aug. 8, 2022

(65) Prior Publication Data
US 2022/0403803 A1 Dec. 22, 2022

Related U.S. Application Data (62) Division of application No. 17/350,611, filed on Jun. 17, 2021, now Pat. No. 11,454,180.

(51) Int. Cl.
*F02D 41/00* (2006.01)
*F01N 13/10* (2010.01)
(Continued)

(52) U.S. Cl.
CPC ......... *F02D 41/0047* (2013.01); *F01N 13/10* (2013.01); *F02B 37/00* (2013.01); *F02B 37/24* (2013.01); *F02B 47/08* (2013.01); *F02D 21/02* (2013.01); *F02M 26/04* (2016.02); *F02M 26/05* (2016.02); *F02M 26/09* (2016.02); *F02M 26/14* (2016.02); *F02M 26/17* (2016.02);
(Continued)

(58) Field of Classification Search
CPC ................ F02D 41/0047; F02D 21/02; F02D 2200/0406; F02D 2200/0414; F01N 13/10; F02B 37/00; F02B 37/24; F02B 47/08; F02M 26/04; F02M 26/05; F02M 26/09; F02M 26/14; F02M 26/17; F02M 26/22; F02M 26/25; F02M 26/38; F02M 26/42; F02M 35/10222
See application file for complete search history.

(56) References Cited

U.S. PATENT DOCUMENTS

| | | |
|---|---|---|
| 6,178,749 B1 | 1/2001 | Kolmanovsky et al. |
| 6,732,523 B2 | 5/2004 | Birkner et al. |

(Continued)

FOREIGN PATENT DOCUMENTS

| | | |
|---|---|---|
| DE | 202011104961 U1 | 12/2011 |
| DE | 102013205010 | 9/2014 |

(Continued)

*Primary Examiner* — Audrey B. Walter
(74) *Attorney, Agent, or Firm* — Taft Stettinius & Hollister LLP (57) ABSTRACT

A system and method of exhaust gas recirculation (EGR) in an internal combustion engine are provided. The EGR system includes a first EGR flow path and a second EGR flow path independent of the first EGR flow path that are each configured to recirculate high pressure exhaust from the exhaust system back to the engine intake system. The system includes a controller in operable communication with the EGR system configured to selectively control an amount of EGR flow through at least one of the first and second EGR flow paths.

20 Claims, 5 Drawing Sheets

(51) Int. Cl.

| | |
|---|---|
| *F02B 37/00* | (2006.01) |
| *F02M 26/04* | (2016.01) |
| *F02M 26/05* | (2016.01) |
| *F02M 26/09* | (2016.01) |
| *F02M 26/14* | (2016.01) |
| *F02M 26/17* | (2016.01) |
| *F02M 26/22* | (2016.01) |
| *F02M 26/25* | (2016.01) |
| *F02B 37/24* | (2006.01) |
| *F02M 35/10* | (2006.01) |
| *F02M 26/38* | (2016.01) |
| *F02M 26/42* | (2016.01) |
| *F02B 47/08* | (2006.01) |
| *F02D 21/02* | (2006.01) |

(52) U.S. Cl.
CPC .......... *F02M 26/22* (2016.02); *F02M 26/25* (2016.02); *F02M 26/38* (2016.02); *F02M 26/42* (2016.02); *F02M 35/10222* (2013.01); *F02D 2200/0406* (2013.01); *F02D 2200/0414* (2013.01)

(56) References Cited

U.S. PATENT DOCUMENTS

| | | | |
|---|---|---|---|
| 6,976,480 B2 | 12/2005 | Miyoshi et al. | |
| 7,261,086 B2 | 8/2007 | Nuang | |
| 7,328,577 B2 | 2/2008 | Stewart et al. | |
| 7,363,919 B1 | 4/2008 | Styles | |
| 7,367,188 B2 | 5/2008 | Barbe et al. | |
| 7,512,479 B1 | 3/2009 | Wang | |
| 8,393,314 B2 | 3/2013 | Cattani et al. | |
| 8,528,529 B2 | 9/2013 | Ewen | |
| 8,630,787 B2 | 1/2014 | Shutty et al. | |
| 9,146,545 B2 | 9/2015 | Stewart | |
| 9,297,325 B2 | 3/2016 | Sujan et al. | |
| 9,366,178 B2 | 6/2016 | Styles et al. | |
| 9,482,164 B2 | 11/2016 | Javaherian et al. | |
| 9,644,548 B2 | 5/2017 | Wu et al. | |
| 9,689,322 B2 | 6/2017 | Xiao et al. | |
| 9,689,335 B2 | 6/2017 | Ge | |
| 10,066,564 B2 | 9/2018 | Song et al. | |
| 10,132,230 B2 | 11/2018 | Shutty et al. | |
| 2006/0278204 A1 | 12/2006 | Hatano | |
| 2007/0017489 A1 | 1/2007 | Kuroki et al. | |
| 2007/0101977 A1 | 5/2007 | Stewart | |
| 2009/0077968 A1 | 3/2009 | Sun | |
| 2009/0101122 A1* | 4/2009 | Kurtz | F02M 26/50 123/568.12 |
| 2010/0199957 A1 | 8/2010 | Furukawa et al. | |
| 2011/0016862 A1* | 1/2011 | Song | F02B 37/013 60/602 |
| 2011/0023842 A1* | 2/2011 | Kurtz | F02M 26/05 60/602 |
| 2011/0023843 A1 | 2/2011 | Ewen | |
| 2011/0108013 A1 | 5/2011 | Melhem et al. | |
| 2014/0026539 A1* | 1/2014 | Kurtz | F02D 41/024 60/273 |
| 2014/0041384 A1* | 2/2014 | Mischler | F02D 41/0052 60/273 |
| 2014/0102428 A1* | 4/2014 | Fulton | F02M 26/24 123/568.12 |
| 2015/0040852 A1* | 2/2015 | Pursifull | F02M 35/10386 123/184.56 |
| 2016/0032871 A1 | 2/2016 | Keefover et al. | |
| 2016/0097332 A1* | 4/2016 | Ulrey | F02D 41/005 123/395 |
| 2016/0222898 A1* | 8/2016 | Ulrey | F02D 41/12 |
| 2017/0067405 A1* | 3/2017 | Nakano | F02D 41/1495 |
| 2019/0277225 A1 | 9/2019 | Chen et al. | |
| 2020/0191084 A1* | 6/2020 | Baron Von Ceumern-Lindenstjerna | F02D 41/068 |
| 2021/0262419 A1 | 8/2021 | Matsumoto et al. | |

FOREIGN PATENT DOCUMENTS

| | | | |
|---|---|---|---|
| DE | 102015015536 A1 | 6/2017 | |
| DE | 102017204722 A1 | 9/2018 | |
| IN | 201741007581 A | 9/2018 | |
| JP | 2010196617 A * | 9/2010 | ......... F02D 41/0072 |
| WO | 2008031959 A1 | 3/2008 | |
| WO | 2011025135 A1 | 3/2011 | |
| WO | 2017048233 A1 | 3/2017 | |

* cited by examiner

SYSTEMS AND METHODS FOR EXHAUST GAS RECIRCULATION

CROSS-REFERENCE TO RELATED APPLICATION

The present application is a divisional of U.S. application Ser. No. 17/350,611 filed on Jun. 17, 2021, which is incorporated herein by reference in its entirety for all purposes.

FIELD OF THE DISCLOSURE

The present disclosure relates generally to internal combustion engines, and more particularly, but not exclusively, to exhaust gas recirculation (EGR) systems and methods therefore.

BACKGROUND

At present, existing engine systems generally recirculate exhaust gas utilizing a single flow path for high pressure EGR flow to the intake system. The exhaust gas flows from an exhaust manifold through a return line that returns the exhaust to an intake manifold of the engine. The return line creates the flow path that directs the recirculated exhaust to an EGR cooler provided in the flow path. Some EGR systems are configured with a bypass to bypass the EGR cooler and an EGR valve positioned upstream of the EGR cooler. EGR systems may also utilize two EGR flow paths with one flow path recirculating high pressure exhaust from upstream of a turbine, and another flow path recirculating low pressure exhaust from downstream of the turbine.

There exists a need for EGR systems with increased flexibility and improved performance in controlling the recirculation of exhaust gas. As such, there remains a substantial need for the unique methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

The present disclosure includes unique systems and methods for exhaust gas recirculation in an internal combustion engine. One system includes an internal combustion engine including a plurality of cylinders, an intake system for directing a charge flow to the plurality of cylinders, and an exhaust system for receiving exhaust from the plurality of cylinders and directing the exhaust out of the exhaust system. The system includes an EGR system for recirculating exhaust from the exhaust system, wherein the EGR system includes a first EGR flow path and a second EGR flow path independent of the first EGR flow path that are each configured to recirculate high pressure exhaust from the exhaust system to the intake system. The system further includes a controller in operable communication with the EGR system configured to selectively control an amount of EGR flow through at least one of the first and second EGR flow paths.

One method includes operating an internal combustion engine, the internal combustion engine including a plurality of cylinders, an intake system for directing a charge flow to the plurality of cylinders, and an exhaust system for receiving exhaust from the plurality of cylinders and directing the exhaust out of the exhaust system. The method includes selecting, in response to at least one EGR parameter, at least one of a first EGR flow path and a second EGR flow path that are each high pressure exhaust flow paths and independent of one another. The method further includes recirculating exhaust from the exhaust system through the selected at least one of the first and second EGR flow paths.

In an embodiment, the intake system includes a mass air flow sensor to provide mass air flow readings to a controller. The EGR system may also include one of an intake manifold pressure sensor, an exhaust oxygen sensor, and an intake manifold oxygen sensor to provide readings to the controller that are used in conjunction with the mass air flow readings to control the EGR flow to the intake system at the desired temperature.

Another EGR system may be configured with an EGR flow path for recirculating high pressure exhaust that includes an EGR cooler and an EGR cooler bypass. An EGR bypass valve can control EGR flow through the EGR cooler or the EGR bypass, and an EGR flow valve can control the EGR temperature provided to the intake system. The valves can be arranged in a series or parallel configuration in the EGR flow path. The intake system includes a mass air flow sensor to provide mass air flow readings to a controller. The EGR system may also include one of an intake manifold pressure sensor, an exhaust oxygen sensor, and an intake manifold oxygen sensor to provide readings to the controller that are used in conjunction with the mass air flow readings to control the EGR flow to the intake system at the desired temperature.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

The present disclosure relates to EGR systems and methods for recirculating exhaust gas. According to one aspect of the present disclosure, the EGR system may be configured with two EGR flow paths for recirculating high pressure exhaust including. For example, one flow path provides a hot exhaust return (e.g., hot side exhaust with an EGR cooler) than the other flow path having a cold exhaust return (e.g., cold side exhaust with no EGR cooler). Both of the EGR flow paths include an EGR valve. The hot side EGR flow path incorporates an EGR cooler and an EGR valve downstream of the EGR cooler. The hot side and cold side EGR flow paths can be used to independently or in combination blend and provide control of EGR fraction, provide optimal intake manifold pressure and temperature, reduce emissions, and improve drive cycle performance.

According to another aspect of the present disclosure, the EGR system may be configured with an EGR flow path for recirculating high pressure exhaust that includes an EGR cooler and an EGR cooler bypass. An EGR bypass valve can control EGR flow through the EGR cooler or the EGR bypass, and an EGR flow valve can control the EGR temperature provided to the intake system. The valves can be arranged in a series or parallel configuration in the EGR flow path. The intake system includes a mass air flow sensor to provide mass air flow readings to a controller. The EGR system may also include one of an intake manifold pressure sensor, an exhaust oxygen sensor, and an intake manifold oxygen sensor to provide readings to the controller that are used in conjunction with the mass air flow readings to control the EGR flow to the intake system at the desired temperature.

Figure 1:
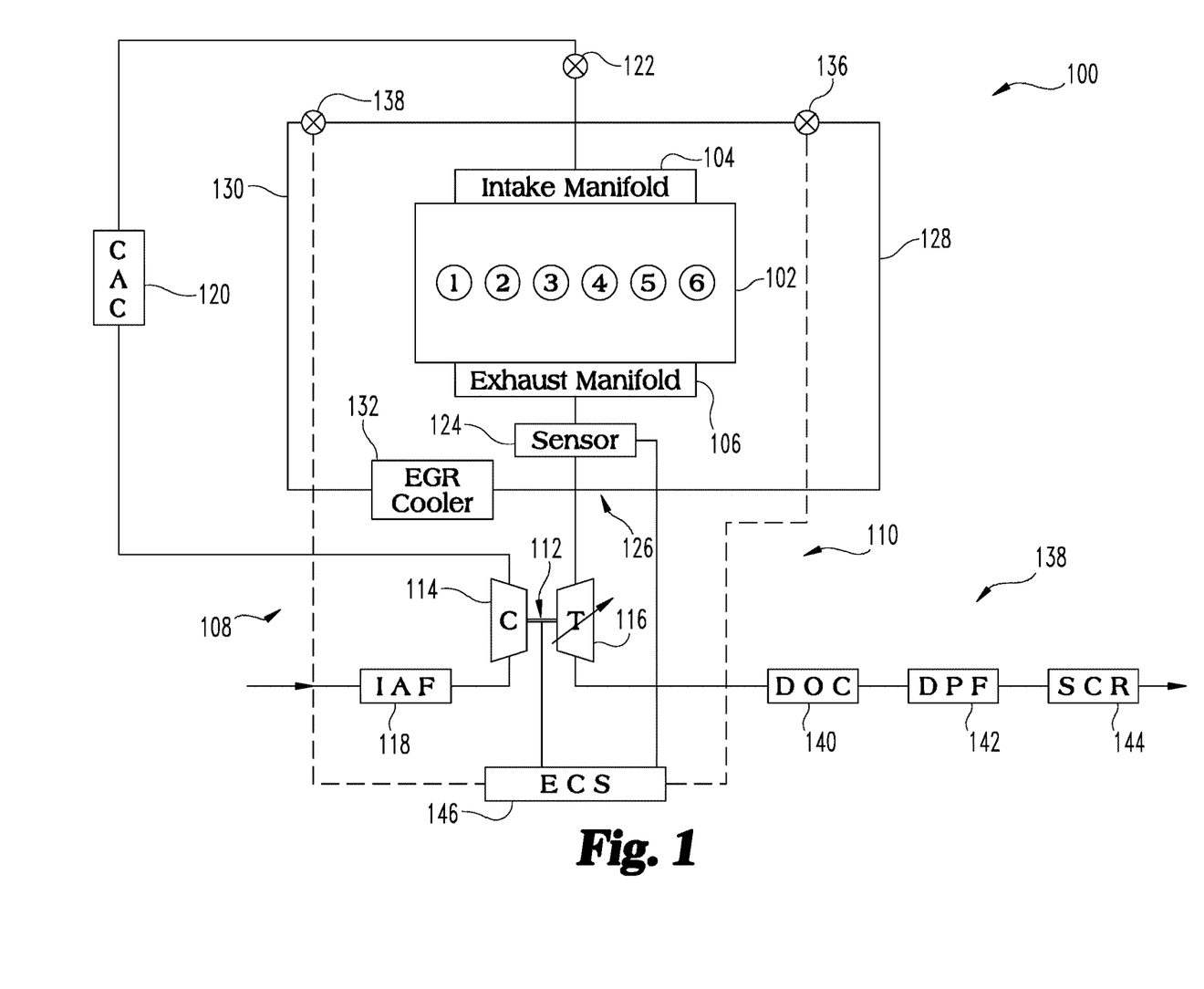
FIG. 1 is a schematic diagram illustrating certain aspects of an example internal combustion engine system.

With reference to FIG. 1, there is illustrated a schematic view depicting certain aspects of an example engine system 100 including an engine 102. The engine 102 is an internal combustion engine of any type, and may include a stoichiometric engine, a gasoline engine, and/or a natural gas engine. In certain embodiments, the engine 102 includes a lean combustion engine such as a lean burn gasoline engine or a diesel cycle engine. In certain embodiments, the engine 102 may be any engine type producing emissions that may include an EGR system, for example, to reduce $NO_x$ emissions from the engine 102. The engine 102 includes a plurality of cylinders 1-6. The number of cylinders may be any number suitable for an engine, and the arrangement of cylinders may be in-line, V, or any suitable arrangement. The system 100 includes an inline 6 cylinder arrangement for illustration purposes only and is not limited to such.

In the illustrated embodiment, engine system 100 includes an intake system 108 and an exhaust system 110. The engine 102 is in fluid communication with the intake system 108 through which charge air enters an intake manifold 104 and with the exhaust system 110 through which exhaust gas resulting from combustion exits by way of an exhaust manifold 106. The engine 102 includes a number of cylinders (e.g., cylinders 1 through 6) forming combustion chambers in which a charge flow mixture of fuel and air is combusted. For example, the energy released by combustion powers the engine 102 via pistons in the cylinders connected to a crankshaft. Intake valves control the admission of charge air into the cylinders, and exhaust valves control the outflow of exhaust gas through exhaust manifold 106 and ultimately to the atmosphere. It shall be appreciated that the intake manifold 104 and/or exhaust manifold 106 may be a single manifold or multiple exhaust manifolds.

The engine system 100 includes a turbocharger 112 having a compressor 114 and a turbine 116. The compressor 114 is configured to receive intake air from air filter 118 of the intake system 108 and operable to compress ambient air before the ambient air enters the intake manifold 104 of the engine 102 at increased pressure. The air from the compressor 114 is pumped through the intake system 108, to the intake manifold 104, and into the cylinders of the engine 102, typically producing torque on the crankshaft. The intake system 108 includes intake air filter 118 flow coupled with a charge air cooler (CAC) 120 which is operable to cool the charge flow provided to the intake manifold 104. The intake system 108 also includes an air intake throttle 122 which can be controlled to influence the air flow into the cylinders.

The turbocharger 112 may be a variable geometry turbocharger (VGT) or a fixed geometry turbocharger. Those persons skill in the art may appreciate that the variable geometry turbine allows significant flexibility over the pressure ratio across the turbine. In diesel engines, for example, this flexibility can be used for improving low speed torque characteristics, reducing turbocharger lag and driving exhaust gas recirculation flow. In an example embodiment, the VGT can be adjusted to increase engine load and thereby configured to increase exhaust gas temperature. In another embodiment, the turbocharger 112 includes a wastegate.

The exhaust system 110 includes an exhaust gas sensor 124 to sense the temperature of the exhaust gas exiting the exhaust manifold 106. The exhaust system 110 includes an EGR system 126 for recirculating exhaust from the exhaust system 110. In an example embodiment, the EGR system 126 may include a first EGR flow path 128 and a second EGR flow path 130 upstream of the turbocharger 112. The second EGR flow path 130 is independent of the first EGR flow path 128. For example, the EGR system 126 is configured to provide a parallel arrangement in which the first and second EGR flow paths 128 and 130 are completely separate return EGR lines that independently returning exhaust back to the intake manifold 104.

In the example embodiment, the first EGR flow path 128 and the second EGR flow path 130 are configured to recirculate high pressure exhaust from the exhaust system 110 back to the intake system 108. Each EGR flow path 128, 130 is connected to an exhaust conduit of the exhaust system 110 upstream of the turbine 116. The connection may be at a common junction, or at separate junctions.

The exhaust flow path 130 of the exhaust system 110 also includes an EGR cooler 132 to cool the exhaust exiting the exhaust manifold 106 before the exhaust returns to the intake manifold 104. A bypass around EGR cooler 132 is not shown in FIG. 1. In an example embodiment, the exhaust system 110 may include an EGR cooler 132 in the second flow path 130 only without an EGR cooler in the first flow path 128. In FIG. 1, the exhaust system 110 is configured with the EGR cooler 132 in the second flow path 130. In other embodiments, the EGR cooler 132 may be provided in the first flow path 128 only instead of the second flow path 130.

The first and second EGR flow paths 128 and 130 are configured to direct EGR flow having respective first and second temperatures into the intake system 108. In the example embodiment in which the EGR cooler 132 is provided in the second flow path 130, the EGR flow temperature in the second flow path 130 that is returned to the intake manifold 104 may be less than the EGR flow temperature in the first flow path 128.

The first and second flow paths 128 and 130 include respective first and second EGR valves 136 and 138 provided at an end-most position of the respective paths 128 and 130 in the EGR system 126. In the illustrative example embodiment, the second EGR valve 138 is provided at the end-most position of the second flow path 130 downstream of the EGR cooler 132. The EGR valves 136, 138 can be cooled, or can be un-cooled. In addition, the EGR valves 136, 138 can be identical to one another to provide cost savings. It shall be appreciated that the intake system 108 and/or the exhaust system 110 may further include various components not shown, such as additional coolers, valves, and bypasses, for example.

The engine system 100 includes an exhaust aftertreatment (AT) system 136 downstream of the turbine 116. Any suitable AT system 136 is contemplated. In the illustrated embodiment, the AT system 136 includes a diesel oxidation catalyst (DOC) 138, a diesel particulate filter (DPF) 140, and a selective catalytic reduction (SCR) 144.

The engine system 100 further includes a controller 146 structured to perform certain operations and to receive and interpret signals from any component and/or sensor of the engine system 100. In an example embodiment, the controller 146 is in operable communication with the EGR system 126 and may be configured to selectively control EGR flow through the first and second EGR flow paths 128 and 130. For example, the controller 146 may control an amount of EGR flow through the first and second EGR flow paths 128 and 130 by selectively opening and closing a respective one of the first and second EGR valves 136 and 138 to independently recirculate exhaust gas through only the selected one of the first and second EGR flow paths 128 and 130. In another example embodiment, the controller 146 may be configured to control EGR flow through the first and second EGR flow paths 128 and 130 by opening the first and second EGR valves 136 and 138 simultaneously to recirculate exhaust gas through each of the first and second EGR valves 136 and 138. The controller 146 may control first and second EGR valves 136, 138 in response to a mass air flow to the intake manifold and an oxygen amount in the exhaust.

The controller 146 may be in communication with the exhaust gas sensor 124 and/or any other engine sensor, such as intake manifold pressure and temperatures sensor, lambda sensors, combustion parameters sensors, AT system sensors, etc. to be able to perform any described operations. Certain control operations described herein may include operations to determine one or more parameters such as, but not limited to, EGR parameters. The EGR parameters may include, for example, intake manifold pressure, intake manifold temperature, an EGR fraction, fuel economy, transient performance (time to boost), drive cycle performance, and NOx emissions. It shall be appreciated that the controller 146 may be in communication with any actuators, sensors, datalinks, computing devices, wireless connections, or other devices to be able to perform any described operations.

It shall be appreciated that the controller 146 may be provided in a variety of forms and configurations including one or more computing devices forming a whole or a part of a processing subsystem having non-transitory memory storing computer-executable instructions, processing, and communication hardware. The controller 146 may be a single device or a distributed device, and the functions of the controller 146 may be performed by hardware or software. The controller 146 may include one or more non-transitory memory devices configured to store instructions in memory which are readable and executable by the controller 146 to control operation of engine 102 as described herein. Controller 146 may be configured to determine and may perform acts of determining in a number of manners, for example, by calculating or computing a value, obtaining a value from a lookup table or using a lookup operation, receiving values from a datalink or network communication, receiving an electronic signal (e.g., a voltage, frequency, current, or pulse-width modulation signal) indicative of the value, receiving a parameter indicative of the value, reading the value from a memory location on a computer-readable medium, receiving the value as a run-time parameter, and/or by receiving a value by which the interpreted parameter can be calculated, and/or by referencing a default value that is interpreted to be the parameter value.

Controller 146 is one example of a component of an integrated circuit-based electronic control system (ECS) that may be configured to control various operational aspects of the engine system 100. An ECS according to the present disclosure may be implemented in a number of forms and may include a number of different elements and configurations of elements. In certain forms, an ECS may incorporate one or more microprocessor-based or microcontroller-based electronic control units sometimes referred to as electronic control modules. An ECS according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an ECS and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

Figure 2:
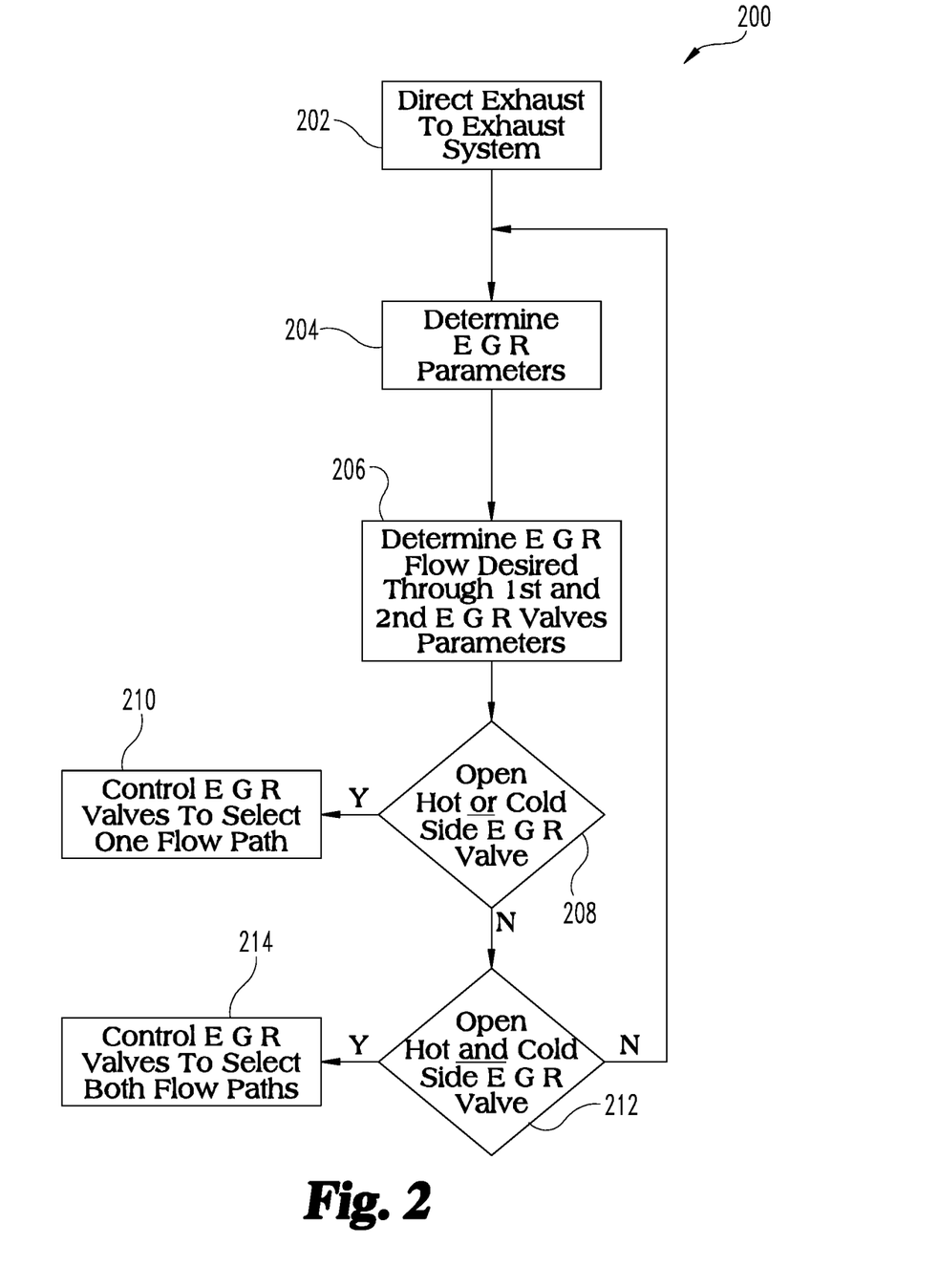
FIG. 2 is a flow diagram illustrating certain aspects of an example exhaust gas recirculation system for an internal combustion engine system.

With reference to FIG. 2, there is illustrated a flow diagram of an example procedure 200 for directing exhaust gas from the exhaust system 110 to the intake system 108 via EGR system 26. Procedure 200 may be implemented and executed in connection with one or more components of the ECS 146 described above in connection with engine system 100 or in connection with a number of other ECS components.

Procedure 200 begins at operation 202 by directing exhaust gas to exhaust system 126 by operation of engine 102. Procedure 200 continues at operation 204 in which the ECS 146 may determine one or more EGR parameters such as, for example, intake manifold pressure, intake manifold temperature, an EGR fraction, fuel economy, drive cycle performance, transient performance (time to boost), and/or NOx emissions. Procedure 200 continues at operation 206 to determine an EGR flow, such as an EGR flow temperature to be provided, desired in response to the one or more EGR parameters. For example, during a warm-up condition the highest possible temperature EGR flow may be desired.

From operation 206, procedure 200 proceeds at conditional 208 to determine if EGR flow from only one of the first and second flow paths 128, 130 can be provided in response to the desired EGR flow determined at operation 206. If conditional 208 is YES, the selected EGR flow path 128, 130 has its EGR valve 136, 138 opened while the other EGR valve 136, 138 is closed at operation 210. For example, the temperature in the first EGR flow path 128 may have a higher temperature than the temperature in the second EGR flow path 130 due to the second EGR flow path 130 having the EGR cooler 134. In this example embodiment, if faster warmup is desired, the second EGR valve 138 downstream of the EGR cooler is closed, and the first EGR valve 136 is opened. In another example embodiment, if lower temperature EGR flow is desired, the first EGR valve 136 is closed and the second EGR valve 138 is opened.

If conditional 208 is NO, procedure 200 continues at conditional 212 to determine if EGR flow from both EGR flow paths 128, 130 can be provided in response to the desired EGR flow determined at operation 206. If conditional 212 is NO, procedure 200 returned to operation 204. If conditional 212 is YES, procedure 200 continues at operation 214. At operation 214 each of the first and second EGR valves 136, 138 is opened to provide EGR flow from both the first and second EGR flow paths 128, 130 in response to the desired EGR flow. It is contemplated that the opening and closing amount of the EGR valves 136, 138 can be varied between 0% and 100% to provide the desired proportion of EGR flow from each flow path 128, 130 to satisfy the EGR parameters.

Referring to FIGS. 3A-5, there are shown various embodiments of another aspect of the present disclosure in which a single EGR flow path is provided with an EGR module that includes an EGR cooler and an EGR cooler bypass, and various sensor architectures to provide an EGR flow with a desired temperature. Components in FIGS. 3A-5 that are similar to the components of engine system 100 described above are referenced with the same reference numerals, and will not be re-described for sake of brevity. The discussion that follows will focus on aspects of the systems in FIGS. 3A-5 not discussed above.

Figures 3A, 3B, 3C:
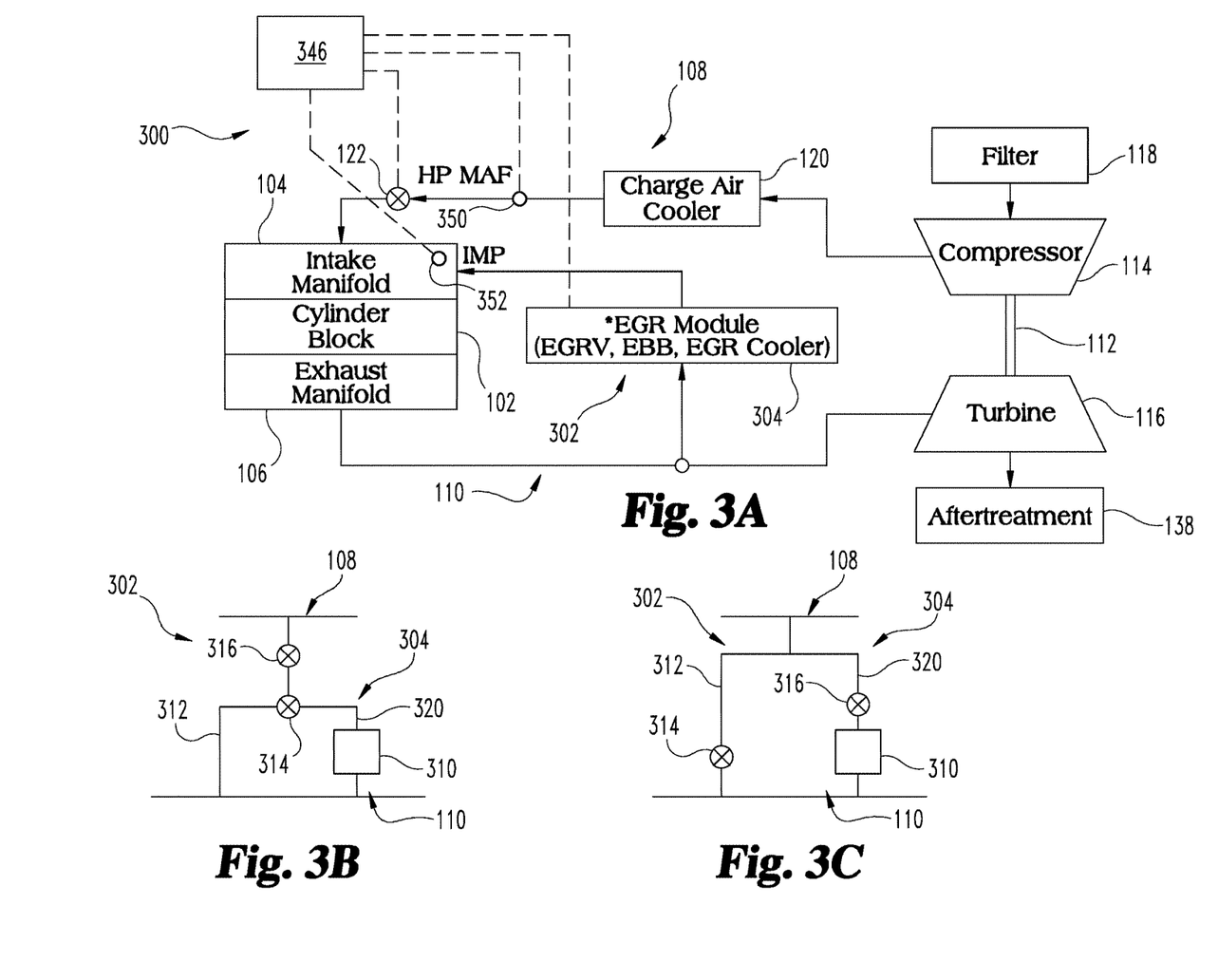
FIG. 3A is a schematic diagram of another example internal combustion engine system.
FIGS. 3B and 3C show a series arrangement and a parallel arrangement, respectively, for the EGR module of FIG. 3A.

In FIG. 3A there is shown an engine system 300 that includes an EGR flow path 302 with an EGR module 304, a controller 346, an intake manifold pressure sensor 352 at intake manifold 104, and a mass air flow sensor 350 in the intake system 108. Controller 346 can include any of the features of controller 146 discloses above, and is operatively coupled to mass air flow sensor 350 and intake manifold pressure sensor 352 to receive signals indicative of the mass air flow and intake manifold pressure to control the EGR flow, as discussed further below.

In FIG. 3B, one embodiment of EGR module 304 is shown with a series arrangement which includes an EGR cooler 310 and an EGR cooler bypass 312 in the EGR flow path 302. Bypass valve(s) 314 are provided at the junction of the EGR cooler flow path 320 and the EGR cooler bypass 312 to control EGR flow in the EGR bypass 312. An EGR flow valve 316 is provided in series with and downstream of bypass valve 314 to control the EGR temperature of the EGR flow that is provided to intake system 108. In FIG. 3C a parallel arrangement is shown in which the bypass valve 314 is provided in bypass 312 and the EGR flow valve 316 is provided downstream of EGR cooler 310 in the EGR cooler flow path 320. In either embodiment, the controller 346 modules the valves 314, 316 to provide the desired amount of EGR flow at the desired temperature in response to one or more operating conditions of engine system 300.

Referring back to FIG. 3A, the mass air flow sensor 350 is located downstream of compressor 114 and upstream of intake throttle 122 to sense the mass air flow of the compressed intake air upstream of intake manifold 104. The intake manifold pressure sensor 352 senses the intake manifold pressure at intake manifold 104. The disclosed sensing architecture allows the EGR flow to be observed or estimated at controller 346 so that the positioning of valves 314, 316 can be controlled to provide the desired EGR flow and EGR temperature.

For example, using these inputs, the intake manifold breathing dynamics can be modelled as follows:

$$\frac{dp_{im}}{dt} = \frac{RT_{im}}{V_{im}}(W_{th} + W_{egr} - W_c) \quad \text{Equation 1}$$

In Equation 1, $W_{th}$ is the throttle flow from mass air flow sensor 350; $W_c$ is the charge flow from a virtual sensor; $p_{im}$ is the intake manifold pressure from intake manifold pressure sensor 352; $T_{im}$ is the intake manifold temperature; Vim is the intake manifold volume; and $W_{egr}$ is the observable or estimated EGR flow. Controller 346 observes or determines $W_{egr}$ for control of the positioning of valves 314, 316.

Figure 4:
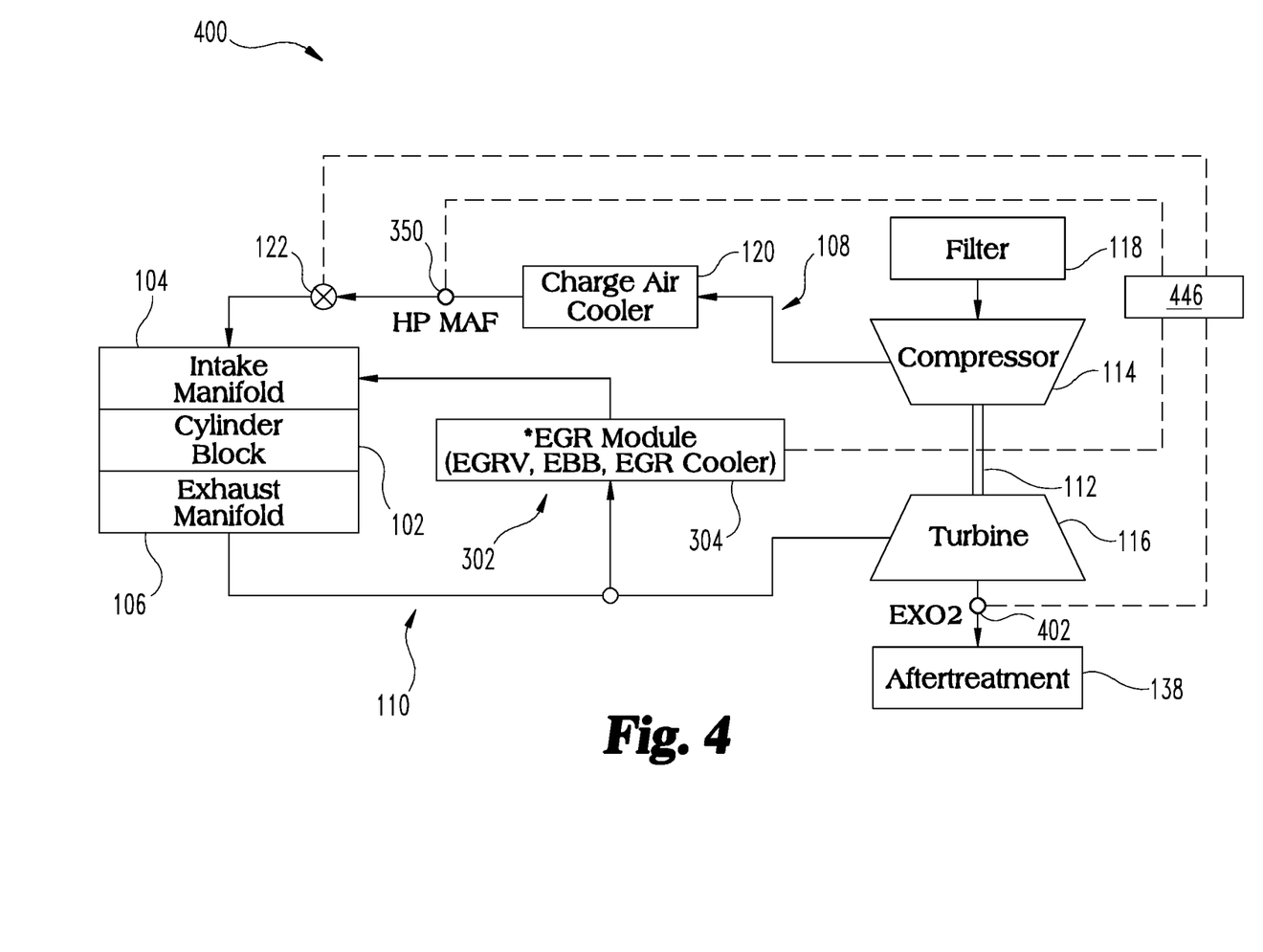
FIG. 4 is a schematic diagram of another embodiment of the internal combustion engine system of FIG. 3.

In FIG. 4, the engine system 400 is disclosed that is similar to engine system 300, but the controller 446 is connected to an exhaust oxygen sensor 402 downstream of turbine 116 to determine the EGR flow in conjunction with the mass air flow from mass air flow sensor 350. Using these inputs, the intake manifold oxygen dynamics can be modelled as follows:

$$\frac{dF_{im}}{dt} = \frac{1}{M_{im}}((F_{air} - F_{im})W_{th} + (F_{ex} - F_{im})W_{egr}) \quad \text{Equation 2}$$

In Equation 2, $W_{th}$ is the throttle flow from mass air flow sensor 350; $M_{im}$ is the ratio of the total gas mass in the intake manifold estimated from intake manifold pressure and intake manifold temperature as shown in Equation 3; $F_{air}$ is 0.21 or the total oxygen concentration in the air, $F_{ex}$ is the exhaust gas concentration from the exhaust oxygen sensor 402; $F_{im}$ is the intake manifold oxygen concentration estimated from $F_{ex}$, $M_c$, $M_f$ using Equation 4; and $W_{egr}$ is the observable or estimated EGR flow. Controller 446 observes or determined $W_{egr}$ and the intake manifold oxygen concentration for control of the positioning valves 314, 316 using the sensing architecture of FIG. 4.

$$M_{im} = \frac{p_{im}V_{im}}{RT_{im}} \quad \text{Equation 3}$$

$$F_{im} = F_{ex}\left(1 + \frac{M_f}{M_c}\right) \quad \text{Equation 4}$$

Figure 5:
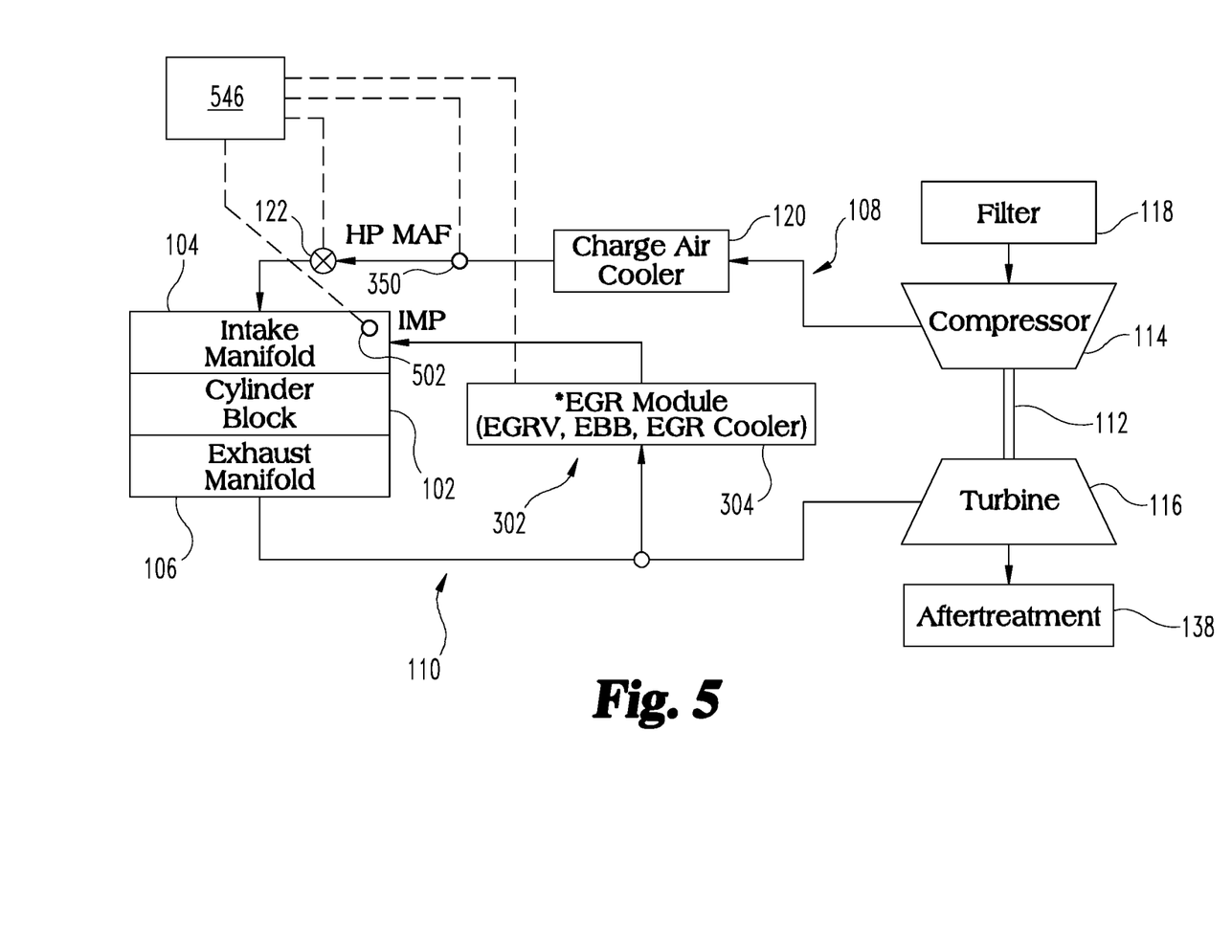
FIG. 5 is a schematic diagram of another embodiment of the internal combustion engine system of FIG. 3.

In FIG. 5, the engine system 500 is disclosed that is similar to engine system 400, but the controller 546 is connected to an intake manifold oxygen sensor 502 to determine the EGR flow in conjunction with the mass air flow from mass air flow sensor 350. Using these inputs, the intake manifold oxygen dynamics can be modelled using Equation 2 above. However, in the FIG. 5 arrangement, $F_{im}$ is provided by the intake manifold oxygen sensor 502, and $F_{ex}$ is estimated from $F_{ex}$, $M_c$ and $M_f$ using Equation 5 below.

Controller 546 observes or determines $W_{egr}$ and the intake manifold oxygen concentration for control of the positioning valves 314, 316 using the sensing architecture of FIG. 5.

$$F_{ex} = F_{im} \frac{M_c}{M_c + M_f} \qquad \text{Equation 5}$$

The engine systems in FIGS. 3A-5 can be operated by controllers 346, 446, 546 to bypass the EGR cooler 310 with bypass 312 under cold start, warmup, and/or keep warm conditions for engine 102 when it is desired to provide more heat to the charge flow to intake manifold 104. A mixture of EGR flow from EGR cooler 310 and EGR bypass 312 can also be provided to control the temperature of the EGR flow to intake manifold 104. EGR flow from EGR bypass 312 can also be stopped under operating conditions in which all the EGR flow is to be cooled by EGR cooler 310 before recirculation to intake manifold 104.

Further written description of a number of aspects of the present disclosure shall now be provided. One aspect is a system comprising an internal combustion engine including a plurality of cylinders, an intake system for directing a charge flow to the plurality of cylinders, and an exhaust system for receiving exhaust from the plurality of cylinders and directing the exhaust out of the exhaust system, an EGR system for recirculating exhaust from the exhaust system. The EGR system includes a first EGR flow path and a second EGR flow path independent of the first EGR flow path that are each configured to recirculate high pressure exhaust from the exhaust system back to the intake system. A controller is in operable communication with the EGR system configured to selectively control an amount of EGR flow through at least one of the first and second EGR flow paths.

In certain forms of the foregoing system, one of the first and second EGR flow paths directs EGR flow having a first temperature to the intake system and the other of the first and second EGR flow paths directs EGR flow having a second temperature to the intake system, wherein the second temperature is less than the first temperature. In certain forms, one of the first and second EGR flow paths includes an EGR cooler and the other of the first and second EGR flow paths does not include an EGR cooler. In certain forms, the one of the first and second EGR flow paths including the EGR cooler includes an EGR valve downstream of the EGR cooler. In certain forms, the first and second EGR flow paths include respective ones of a first EGR valve and a second EGR valve. In certain forms, each of the first and second EGR valves is provided at an end-most position of the respective first and second EGR flow paths. In certain forms, the system comprises a turbocharger operably connected to the intake and exhaust system, wherein each of the first and second EGR flow paths is connected to the exhaust system upstream of the turbocharger. In certain forms, the turbocharger is a variable geometry turbocharger. In certain forms, the controller is configured to control operation of first and second EGR valves to independently allow EGR flow through only one of the first and second EGR flow paths. In certain forms, the controller is configured to control operation of first and second EGR valves to simultaneously allow EGR flow through each of the first and second EGR flow paths in response to a mass air flow to the intake manifold and an oxygen amount in the exhaust.

Another aspect is a method for operating an internal combustion engine including a plurality of cylinders, an intake system for directing a charge flow to the plurality of cylinders, and an exhaust system for receiving exhaust from the plurality of cylinders. The method includes directing the exhaust out of the exhaust system, selecting, in response to at least one EGR parameter, at least one of a first EGR flow path and a second EGR flow path that are each high pressure exhaust flow paths and independent of one another, and recirculating exhaust from the exhaust system through the selected at least one of the first and second EGR flow paths.

In certain forms of the foregoing method, one of the first and second EGR flow paths directs an EGR flow to the intake system having a first temperature and the other of the first and second EGR flow paths directs an EGR flow having a second temperature to the intake system, wherein the second temperature is less than the first temperature. In certain forms, one of the first and second EGR flow paths includes an EGR cooler and the other of the first and second EGR flow paths does not include an EGR cooler. In certain forms, the one of the first and second EGR flow paths including the EGR cooler includes an EGR valve downstream of the EGR cooler. In certain forms, each of the first and second EGR flow paths includes a respect one of a first EGR valve and a second EGR valve. In certain forms, each of the first and second EGR valves is provided at an end-most position of the respective first and second EGR flow paths. In certain forms, a turbocharger is operably connected to the intake system and the exhaust system, wherein each of the first and second EGR flow paths is connected to the exhaust system upstream of the turbocharger. In certain forms, the at least one EGR parameter includes at least one of an intake manifold pressure, an intake manifold temperature, an EGR fraction, a fuel economy, and a NOx emissions value. In certain forms, selecting the at least one of the first and second EGR flow paths includes opening and closing respective ones of first and second EGR valves to independently recirculate exhaust gas through only the selected one of the first and second EGR flow paths. In certain forms, selecting the at least one of the first and second EGR flow paths includes opening first and second EGR valves simultaneously to recirculate exhaust gas through each of the EGR flow paths.

In another aspect of the present disclosure, a system includes an internal combustion engine including a plurality of cylinders, an intake system including an intake manifold for directing a charge flow to the plurality of cylinders, and an exhaust system for receiving exhaust from the plurality of cylinders and directing the exhaust out of the exhaust system. An EGR system recirculates exhaust from the exhaust system. The EGR system includes an EGR flow path configured to recirculate exhaust from the exhaust system to the intake system. The EGR flow path includes an EGR cooler and an EGR cooler bypass for bypassing the EGR cooler.

In one form, a controller is in operable communication with the EGR system that is configured to selectively control an amount of EGR flow through of the EGR cooler and the EGR cooler bypass in response to a mass air flow to the intake manifold and an intake manifold pressure. In an embodiment, the intake system includes a compressor for compressing the charge flow, a charge air cooler downstream of the compressor, and the mass air flow is provided by a mass air flow sensor in the intake system that is downstream of the charge air cooler and the intake manifold pressure is provided by an intake manifold pressure sensor at the intake manifold.

In another form, a controller is in operable communication with the EGR system that is configured to selectively control an amount of EGR flow through the EGR cooler and the EGR cooler bypass in response to a mass air flow to the intake manifold and an oxygen amount in the exhaust. In an embodiment, the intake system includes a compressor for compressing the charge flow, a charge air cooler downstream of the compressor, the mass air flow is provided by a mass air flow sensor in the intake system that is downstream of the charge air cooler, and the exhaust system includes a turbine and the oxygen amount in the exhaust is provided by an oxygen sensor downstream of the turbine.

In another form, a controller is in operable communication with the EGR system that is configured to selectively control an amount of EGR flow through the EGR cooler and the EGR cooler bypass in response to a mass air flow to the intake manifold and an oxygen amount at the intake manifold. In an embodiment, the intake system includes a compressor for compressing an intake air flow, a charge air cooler downstream of the compressor, and the mass air flow is provided by a mass air flow sensor in the intake system that is downstream of the charge air cooler and the oxygen amount is provided by an oxygen sensor at the intake manifold.

In one form, the intake system includes an intake throttle between the mass air flow sensor and the intake manifold. In another form, the EGR system includes an EGR bypass valve and an EGR flow valve arranged in one of a parallel arrangement and a series arrangement.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an internal combustion engine including a plurality of cylinders, an intake system including an intake manifold for directing a charge flow to the plurality of cylinders, and an exhaust system for receiving exhaust from the plurality of cylinders and directing the exhaust out of the exhaust system;
   an exhaust gas recirculation (EGR) system for recirculating exhaust from the exhaust system, wherein the EGR system includes an EGR flow path upstream of a turbine in the exhaust system configured to recirculate high pressure exhaust from the exhaust system to the intake system, wherein the EGR flow path includes an EGR cooler and an EGR cooler bypass for bypassing the EGR cooler; and
   a controller in operable communication with the EGR system configured to determine a desired amount of EGR flow and a desired EGR temperature based on a mass air flow to the intake manifold and an intake manifold pressure, and selectively control the EGR flow of the high pressure exhaust flowing through the EGR cooler and the EGR cooler bypass in response to the determination.

2. The system of claim 1, wherein the EGR system includes an EGR bypass valve and an EGR flow valve arranged in a series arrangement in the EGR flow path.

3. The system of claim 1, wherein the EGR system includes an EGR bypass valve and an EGR flow valve arranged in a parallel arrangement, and the EGR bypass valve and the EGR flow valve are upstream of a junction of an EGR cooler flow path and the EGR cooler bypass.

4. The system of claim 1, wherein the controller is configured to selectively control a temperature of the EGR flow in response to the mass air flow to the intake manifold and the intake manifold pressure.

5. The system of claim 1, wherein the intake system includes a compressor upstream of a connection of the EGR flow path to the intake system.

6. The system of claim 1, wherein the intake system includes a compressor for compressing the charge flow, a charge air cooler downstream of the compressor, and further wherein the mass air flow is provided by a mass air flow sensor in the intake system that is downstream of the charge air cooler and the intake manifold pressure is provided by an intake manifold pressure sensor at the intake manifold.

7. The system of claim 6, wherein the intake system includes an intake throttle between the mass air flow sensor and the intake manifold.

8. A system comprising:
   an internal combustion engine including a plurality of cylinders, an intake system including an intake manifold for directing a charge flow to the plurality of cylinders, and an exhaust system for receiving exhaust from the plurality of cylinders and directing the exhaust out of the exhaust system;
   an exhaust gas recirculation (EGR) system for recirculating exhaust from the exhaust system, wherein the EGR system includes an EGR flow path upstream of a turbine in the exhaust system configured to recirculate high pressure exhaust from the exhaust system to the intake system, wherein the EGR flow path includes an EGR cooler and an EGR cooler bypass for bypassing the EGR cooler; and
   a controller in operable communication with the EGR system configured to determine a desired amount of EGR flow and a desired EGR temperature based on a mass air flow to the intake manifold and a measured oxygen amount in the exhaust, and selectively control the amount of EGR flow of the high pressure exhaust flowing through the EGR cooler and the EGR cooler bypass in response to the same.

9. The system of claim 8, wherein the EGR system includes an EGR bypass valve and an EGR flow valve arranged in a series arrangement in the EGR flow path.

10. The system of claim 8, wherein the EGR system includes an EGR bypass valve and an EGR flow valve arranged in a parallel arrangement, and the EGR bypass valve and the EGR flow valve are upstream of a junction of an EGR cooler flow path and the EGR cooler bypass.

11. The system of claim 8, wherein the controller is configured to selectively control a temperature of the EGR flow in response to the mass air flow to the intake manifold and the oxygen amount in the exhaust.

12. The system of claim 8, wherein the intake system includes a compressor for compressing the charge flow, a charge air cooler downstream of the compressor, and further wherein the mass air flow is provided by a mass air flow sensor in the intake system that is downstream of the charge air cooler; and wherein the oxygen amount in the exhaust is provided by an oxygen sensor downstream of the turbine.

13. The system of claim 12, wherein the intake system includes an intake throttle between the mass air flow sensor and the intake manifold.

14. A system comprising:
an internal combustion engine including a plurality of cylinders, an intake system including an intake manifold for directing a charge flow to the plurality of cylinders, and an exhaust system for receiving exhaust from the plurality of cylinders and directing the exhaust out of the exhaust system;
an exhaust gas recirculation (EGR) system for recirculating exhaust from the exhaust system, wherein the EGR system includes an EGR flow path upstream of a turbine in the exhaust system configured to recirculate high pressure exhaust from the exhaust system to the intake system, wherein the EGR flow path includes an EGR cooler and an EGR cooler bypass for bypassing the EGR cooler; and
a controller in operable communication with the EGR system configured to determine a desired amount of EGR flow and a desired EGR temperature based on a mass air flow to the intake manifold and an oxygen amount measured at the intake manifold, and selectively control an amount of EGR flow of the high pressure exhaust flowing through the EGR cooler and the EGR cooler bypass in response to the same.

15. The system of claim 14, wherein the EGR system includes an EGR bypass valve and an EGR flow valve arranged in a series arrangement in the EGR flow path.

16. The system of claim 14, wherein the EGR system includes an EGR bypass valve and an EGR flow valve arranged in a parallel arrangement, and the EGR bypass valve and the EGR flow valve are upstream of a junction of an EGR cooler flow path and the EGR cooler bypass.

17. The system of claim 14, wherein the controller is configured to selectively control a temperature of the EGR flow in response to the mass air flow to the intake manifold and the oxygen amount in the intake manifold.

18. The system of claim 14, wherein the intake system includes a compressor upstream of a connection of the EGR flow path to the intake system.

19. The system of claim 14, wherein the intake system includes a compressor for compressing an intake air flow, a charge air cooler downstream of the compressor, and further wherein the mass air flow is provided by a mass air flow sensor in the intake system that is downstream of the charge air cooler and the oxygen amount is provided by an oxygen sensor at the intake manifold.

20. The system of claim 19, wherein the intake system includes an intake throttle between the mass air flow sensor and the intake manifold.

* * * * *